United States Patent
Shahana et al.

(10) Patent No.: US 7,011,592 B2
(45) Date of Patent: Mar. 14, 2006

(54) SPROCKET ASSEMBLY FOR A BICYCLE (75) Inventors: Satoshi Shahana, Osaka (JP);
Masanori Kondou, Naga-gun (JP);
Kenji Kamada, Osaka (JP)

(73) Assignee: Shimano, Inc., Sakai (JP)

(*) Notice: Subject to any disclaimer, the term of this patent is extended or adjusted under 35 U.S.C. 154(b) by 0 days.

(21) Appl. No.: 10/095,263

(22) Filed: Mar. 8, 2002

(65) Prior Publication Data
US 2003/0171180 A1 Sep. 11, 2003

(51) Int. Cl.
*F16H 55/12* (2006.01)
(52) U.S. Cl. ...................... 474/160; 474/152
(58) Field of Classification Search ............... 474/152, 474/158, 160, 162, 163, 164; 403/359.1, 403/359.2, 359.6
See application file for complete search history.

(56) References Cited

U.S. PATENT DOCUMENTS

| 2,508,832 | A | * | 5/1950 | McAninch | ............... | 403/359.6 |
| 2,826,934 | A | * | 3/1958 | Jakeway | ............. | 74/553 |
| 3,287,031 | A | * | 11/1966 | Simmons et al. | ............. | 285/27 |
| 3,900,088 | A | * | 8/1975 | Ozaki | ............. | 192/64 |
| 5,324,100 | A | | 6/1994 | James | ............. | 301/110.5 |
| 5,480,357 | A | * | 1/1996 | Liang | ............. | 474/77 |
| 5,536,098 | A | * | 7/1996 | Schwarzler | ............. | 403/259 |
| 6,102,821 | A | | 8/2000 | Nakamura | ............. | 474/160 |
| 6,264,575 | B1 | * | 7/2001 | Lim et al. | ............. | 474/77 |
| 6,428,437 | B1 | * | 8/2002 | Schlanger | ............. | 474/160 |
| 2002/0020984 | A1 | * | 2/2002 | Dunkley | ............. | 280/215 |
| 2003/0064844 | A1 | * | 4/2003 | Lin | ............. | 474/160 |

FOREIGN PATENT DOCUMENTS

| FR | 2571329 | * | 4/1986 |
| FR | 2612870 | | 9/1988 |
| FR | EP 1043221 | * | 10/2000 |
| TW | 484584 | | 4/2002 |

* cited by examiner

*Primary Examiner*—Vicky A. Johnson
(74) *Attorney, Agent, or Firm*—James A. Deland (57) ABSTRACT

A sprocket comprises a sprocket portion having a plurality of radially extending teeth, a first coupling portion extending from a first side of the sprocket portion and having a first coupling structure disposed on an inner peripheral surface thereof, and a second coupling portion extending from an opposite second side of the sprocket portion and having a second coupling structure disposed on an outer peripheral surface thereof. In another embodiment of a sprocket according to the present invention, a sprocket comprises a sprocket portion having a plurality of radially extending teeth, a first coupling portion extending from a first side of the sprocket portion and having a first coupling structure disposed on an inner peripheral surface thereof, and a second coupling structure disposed on an inner peripheral surface of the sprocket.

60 Claims, 7 Drawing Sheets

SPROCKET ASSEMBLY FOR A BICYCLE

BACKGROUND OF THE INVENTION

The present invention is directed to bicycles and, more particularly, to a sprocket assembly that forms a part of a bicycle transmission.

Bicycles typically include a frame, front and rear wheels, pedals that are used to rotate one or more front sprockets, a plurality of rear sprockets mounted to the rear wheel, and a chain that engages a front sprocket and one of the plurality of rear sprockets. If there is more than one front sprocket, then a front derailleur mounted to the frame in close proximity to the plurality of front sprockets is used to shift the chain among the plurality of front sprockets. A rear derailleur is mounted to the frame in close proximity to the plurality of rear sprockets to shift the chain among the plurality of rear sprockets. The rider typically uses manual, electric, or hydraulic control devices to control the front and/or rear derailleurs.

Small bicycles that have a frame capable of folding upon itself to facilitate carrying on public transportation or storage at work facilities are becoming more popular. Because such bicycles are carried and stored in crowded places, they should be very compact. Thus, the sizes of the frame and wheels are minimized accordingly. However, the smaller wheels must rotate faster than a conventional bicycle wheel in order to achieve the same bicycle speed. This, in turn, requires smaller rear sprockets if the bicycle is to achieve the same speed for a given pedaling rate. Unfortunately, the minimum size of any rear sprocket historically has been limited by the diameter of the wheel hub sprocket support on which the sprockets are mounted, which usually must be large enough to house internal components such as ratchet and pawl mechanisms. This makes it unfeasible to accommodate smaller diameter sprockets with conventional hub designs.

SUMMARY OF THE INVENTION

The present invention is directed to a sprocket and sprocket assembly for a bicycle that provides smaller sprockets than conventional sprocket assemblies. In one embodiment of a sprocket according to the present invention, a sprocket comprises a sprocket portion having a plurality of radially extending teeth, a first coupling portion extending from a first side of the sprocket portion and having a first coupling structure disposed on an inner peripheral surface thereof, and a second coupling portion extending from an opposite second side of the sprocket portion and having a second coupling structure disposed on an outer peripheral surface thereof. In another embodiment of a sprocket according to the present invention, a sprocket comprises a sprocket portion having a plurality of radially extending teeth, a first coupling portion extending from a first side of the sprocket portion and having a first coupling structure disposed on an inner peripheral surface thereof, and a second coupling structure disposed on an inner peripheral surface of the sprocket. The latter embodiment may be used with additional sprockets comprising a sprocket portion having a plurality of radially extending teeth and a coupling portion extending from a side of the sprocket portion and having a coupling structure disposed on an outer peripheral surface thereof. The external coupling structure of such a sprocket can engage the internal coupling structure of the adjacent sprocket.

In an embodiment of the present invention directed to an apparatus for supporting a plurality of sprockets, the apparatus comprises a first tubular member having a first end portion and a second end portion, wherein the first tubular member has a first outer peripheral surface for supporting a first plurality of sprockets; a separate second tubular member having a first end portion and a second end portion, wherein the second tubular member has a second outer peripheral surface for supporting a second plurality of sprockets; and wherein the first end portion of the second tubular member is coupled to the second end portion of the first tubular member.

DETAILED DESCRIPTION OF THE EMBODIMENTS

Figure 1:
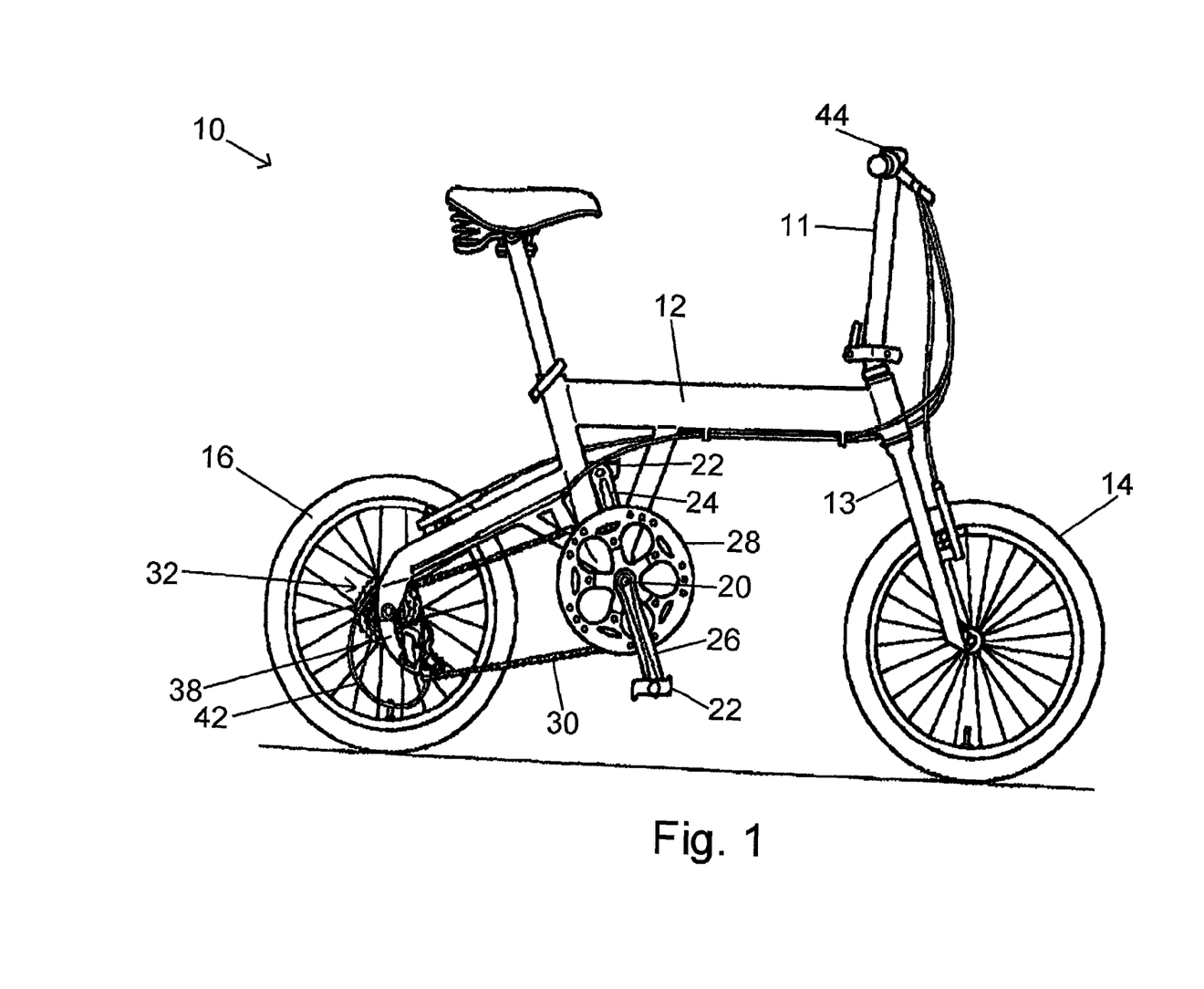
FIG. 1 is a side view of a bicycle that incorporates a particular embodiment of a sprocket assembly according to the present invention.

FIG. 1 is a side view of a bicycle 10 that includes a particular embodiment of a sprocket assembly according to the present invention. Bicycle 10 includes a frame 12 having a front fork 13 that may be rotated by a handlebar assembly 11; a front wheel 14 mounted on the front fork 13; and a rear wheel 16 mounted on the rear of the frame 12. A crank spindle 20 is rotatably supported in a lower median portion of frame 12. The two ends of the crank spindle 20 have nonrotatably mounted thereon a pair of left and right crank arms 24 and 26 (as viewed from the back), each having a pedal 22 mounted to its distal end. The crank arm 26 on the right side is assembled with a front sprocket 28, and a chain 30 is engaged around sprocket 28. A rear hub assembly 32 supporting a plurality of, e.g., nine rear sprockets 34A–34I (FIG. 2) is mounted for rotation with rear wheel 16, and chain 30 engages one of the plurality of rear sprockets 34A–34I. A rear derailleur 38 is mounted to the rear of frame 12 in close proximity to hub assembly 32 for shifting chain 30 among the plurality of sprockets 34A–34I. Rear derailleur 38 is controlled by a control cable 42 attached at one end to rear derailleur 38 and at its other end to a shift control device 44 mounted to handlebar assembly 11.

Figure 2:
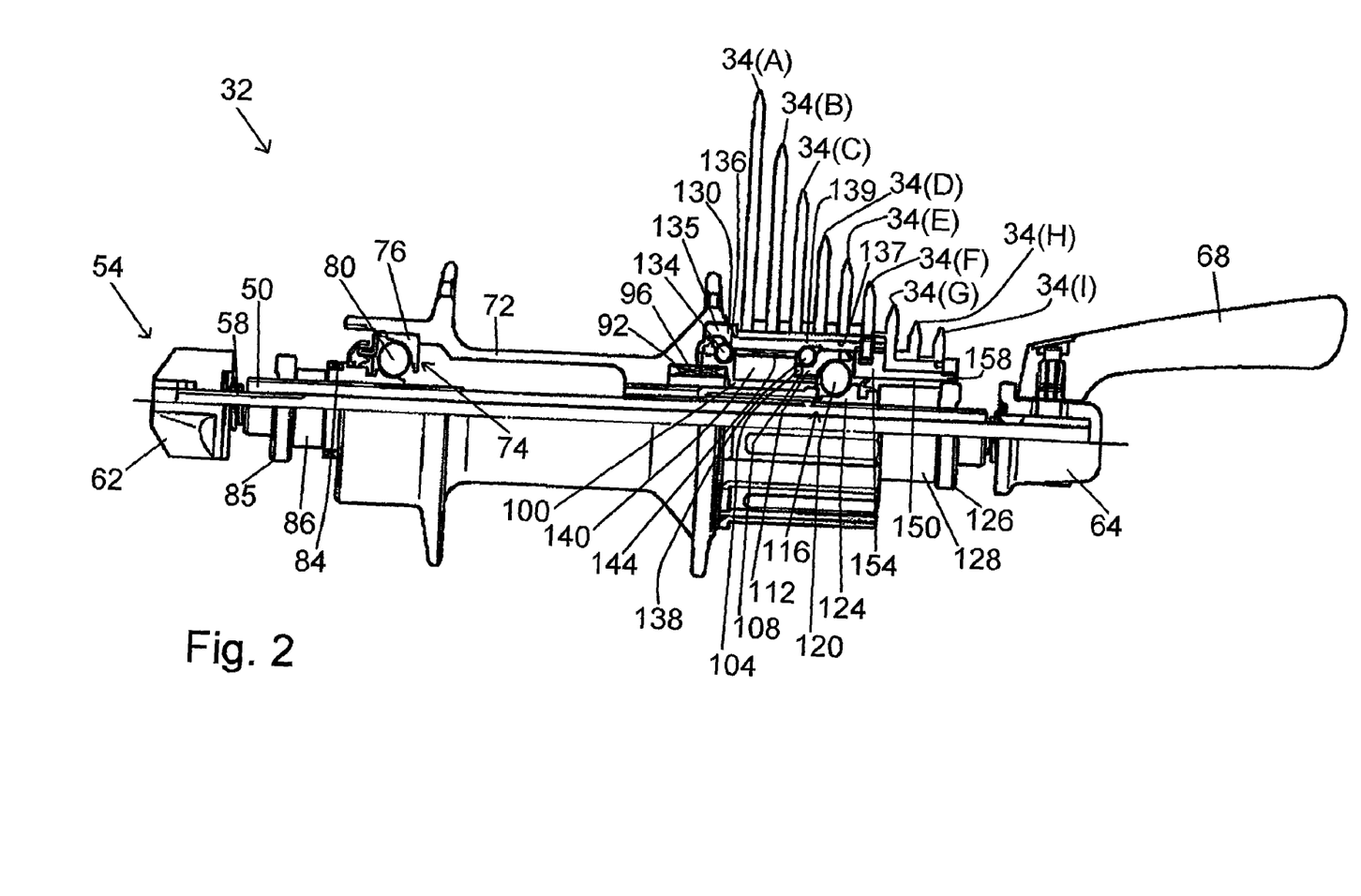
FIG. 2 is a detailed view of the rear hub assembly shown in FIG. 1.

FIG. 2 is a detailed view of hub assembly 32. Hub assembly 32 includes a hollow axle 50 that is retained to frame 12 by a conventional quick-release mechanism 54 that includes a draw bar 58 extending through axle 50, a stationary nut 62 screwed onto the left side of draw bar 58, and a movable nut 64 disposed on the right side of draw bar 58. Movable nut 64 is moved in the axial direction by a cam mechanism 68 in a well known manner so that stationary nut 62 and movable nut 64 clamp axle 50 to frame 12.

The left side of a hub shell 72 is rotatably supported on axle 50 through a bearing assembly 74 comprising an annular outer bearing race 76 mounted to the inner peripheral surface of hub shell 72, an annular inner bearing race 84 mounted around axle 50, and a plurality of ball bearings 80 mounted between outer bearing race 76 and inner bearing race 84. Inner bearing race 84 is held in place on axle 50 by a lock nut 85 and a spacer 86. The right side of hub shell 72 includes a plurality of splines 92 that nonrotatably engage a plurality of splines 96 formed on the left side of an inner body 100. The right side of inner body 100 includes a threaded surface 104 that meshes with a threaded surface 108 formed on an annular outer bearing race 112 of a bearing assembly 116. Bearing assembly 116 further includes an annular inner bearing race 124 mounted to axle 50 and a plurality of ball bearings 120 disposed between outer bearing race 112 and inner bearing race 124. Inner bearing race 124 is held in place on axle 50 by a lock nut 126 and a spacer 128. Thus, the right side of hub shell 72 and inner body 100 are rotatably supported on axle 50 through bearing assembly 116.

An outer body in the form of a first tubular member 130 having a first end portion 135 and a second end portion 137 is rotatably supported on inner body 100 by a plurality of ball bearings 134 and a plurality of ball bearings 138. Ball bearings 134 are disposed between an inner peripheral surface 136 of first end portion 135 of first tubular member 130 and the outer left side of inner body 100, and ball bearings 138 are disposed between an inner peripheral surface 139 of first tubular member 130 and outer bearing race 112 of bearing assembly 116. A plurality of ratchet pawls 140 are disposed around the outer peripheral surface of inner body 100 for engaging a plurality of ratchet teeth 144 formed on the inner peripheral surface of first tubular member 130 in a well known manner to function as a one-way clutch.

A second tubular member 150 has a flanged first end portion 154 and a second end portion 158. The first end portion 154 of second tubular member 150 is coupled to second end portion 137 of first tubular member 130 such that ball bearings 120 are located immediately to the left of first end portion 154 of second tubular member 150. As shown more clearly in FIG. 3, in this embodiment first end portion 154 of second tubular member has a threaded outer peripheral surface 162 that screws into a threaded inner peripheral surface 166 of second end portion 137 of first tubular member 130. Outer peripheral surface 162 also includes a peripheral groove 170 for engaging a fastener 174 which, in this embodiment, is an allen screw that screws into a threaded opening 178 in the second end portion 137 of second tubular member 130 and into groove 170.

Figure 3:
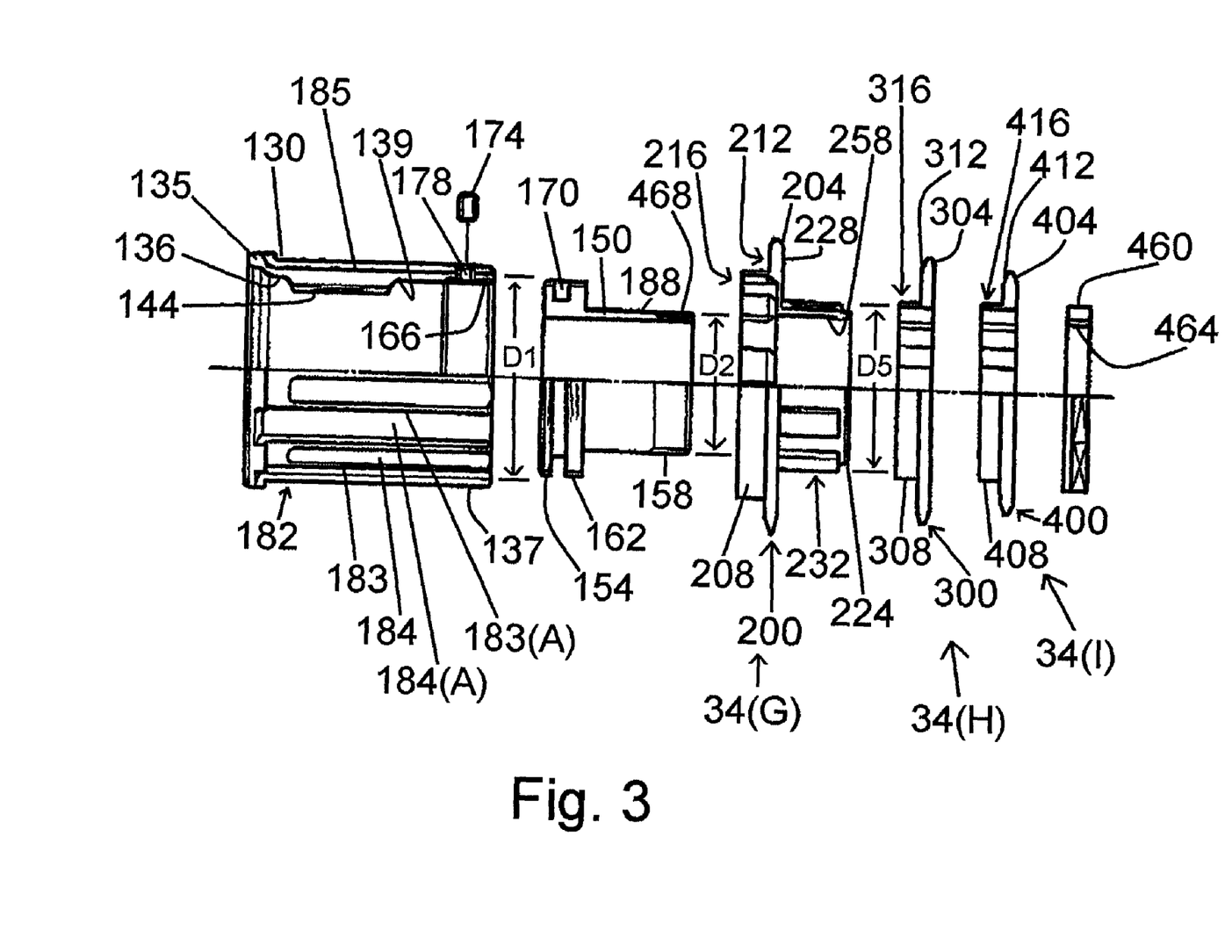
FIG. 3 is an exploded view of some of the components of the sprocket assembly shown in FIG. 2.

As shown in FIG. 3, first tubular member 130 includes a plurality of splines 182 comprising a plurality of spline projections 183 interleaved with a plurality of spline grooves 184 are formed on an outer peripheral surface 185 for nonrotatably engaging a complementary plurality of splines (not shown) formed on the inner peripheral surfaces of sprockets 34(A)–34(F). The same is true for sprocket 34(G) as discussed below. A spline projection 183(A) and a spline groove 184(A) have a different shape than the other spline projections 183 and spline grooves 184 for engaging complementary spline grooves and spline projections on sprockets 34(A)–34(G) to set each of the sprockets 34(A)–34(G) to a predetermined rotational position on first tubular member 130. Second tubular member 150 supports sprockets 34(G)–34(I), but the outer peripheral surface 188 of second tubular member 150 is unsplined. A diameter D1 of the outer peripheral surface 185 of first tubular member that supports sprockets 34(A)–34(F) is greater than a diameter D2 of the unsplined outer peripheral surface 188 of second tubular member 150 that supports sprockets 34(G)–34(I).

Figure 4A:
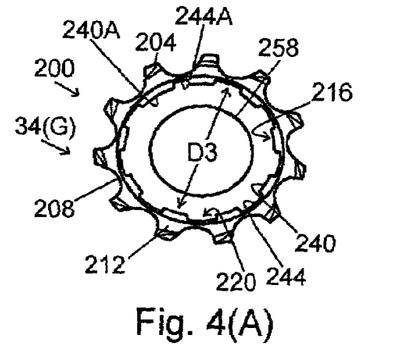
FIGS. 4(A)–4(B) are rear and front views of an 11-tooth transition sprocket used in the sprocket assembly shown in FIG. 2.
Figure 4B:
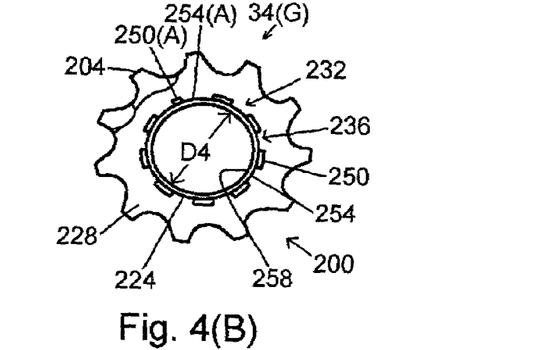

In this embodiment, sprocket 34(G) is supported directly on second tubular member 150, but sprockets 34(H)–34(I) are supported indirectly on second tubular member 150 through sprocket 34(G), which functions as a transition sprocket. As shown in FIGS. 3, 4(A) and 4(B), sprocket 34(G) comprises a sprocket portion 200 having a plurality of (e.g., 11) radially extending teeth 204, a tubular first coupling portion 208 extending from a first side wall 212 of sprocket portion 200 and having a first coupling structure 216 disposed on an inner peripheral surface 220 thereof, and a tubular second coupling portion 224 extending from an opposite second side wall 228 of the sprocket portion 200 and having a second coupling structure 232 disposed on an outer peripheral surface 236 thereof. Sprocket portion 200, first coupling portion 208 and second coupling portion 224 are one piece.

First coupling portion 208 nonrotatably couples sprocket 34(G) to first tubular member 130, and it includes a plurality of first splines comprising a plurality of first spline projections 240 interleaved with a plurality of first spline grooves 244. A spline projection 240(A) and a spline groove 244(A) have a different shape than the other first spline projections 240 and first spline grooves 244 for engaging the corresponding spline groove 184(A) and spline projection 183(A) on first tubular member 130 to set sprocket 34(G) at a predetermined rotational position on first tubular member 130. Second coupling portion 224 includes a plurality of second splines comprising a plurality of second spline projections 250 interleaved with a plurality of second spline grooves 254, wherein a second spline projection 250(A) and a second spline groove 254(A) have a different shape than the other second spline projections 250 and second spline grooves 254 for reasons discussed below. Second coupling portion 224 has an unsplined inner peripheral surface 258 that fits around the unsplined outer peripheral surface 188 of second tubular member 150. A diameter D3 of inner peripheral surface 220 of first coupling portion 208 is greater than a diameter D4 of inner peripheral surface 258 of second coupling portion 224. Diameter D3 also is greater than a diameter D5 of outer peripheral surface 236 of second coupling portion 224. If desired, diameter D5 may be measured at the junction of second coupling portion 224 and side wall 228 of sprocket portion 200.

Figure 5:
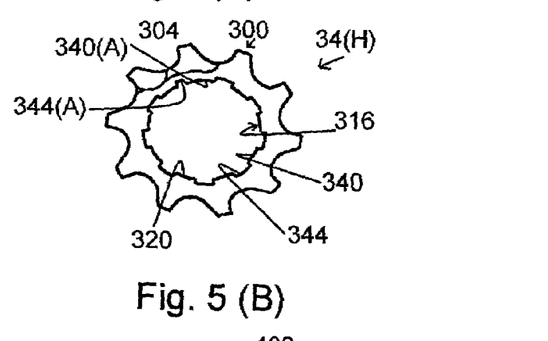
FIGS. 5(A)–5(B) are rear and front views of a 10-tooth sprocket used in the sprocket assembly shown in FIG. 2.
Figure 5A:
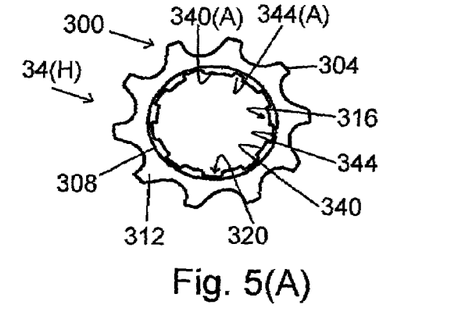

In this embodiment, as shown in FIGS. 3, 5(A) and 5(B), sprocket 34(H) comprises a sprocket portion 300 having a plurality of (e.g., 10) radially extending teeth 304 and a tubular coupling portion 308 extending from a first side wall 312 of sprocket portion 300. Coupling portion 308 has a coupling structure 316 disposed on an inner peripheral surface 320 thereof. Sprocket portion 300 and coupling portion 308 are one piece. Coupling portion 308 includes a plurality of splines comprising a plurality of spline projections 340 interleaved with a plurality of spline grooves 344. A spline projection 340(A) and a spline groove 344(A) have a different shape than the other spline projections 340 and spline grooves 344 for engaging the corresponding second spline groove 254(A) and second spline projection 250(A) on second coupling portion 224 of sprocket 34(G) to set sprocket 34(H) at a predetermined rotational position relative to sprocket 34(G).

Figure 6A:
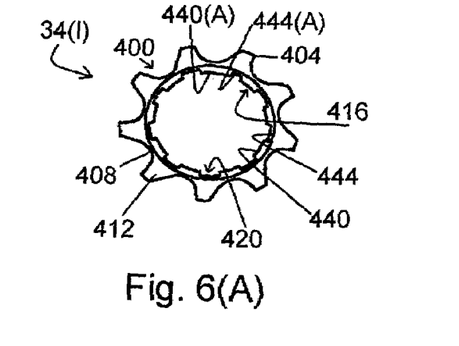
FIGS. 6(A)–6(B) are rear and front views of a 9-tooth sprocket used in the sprocket assembly shown in FIG. 2.
Figure 6B:
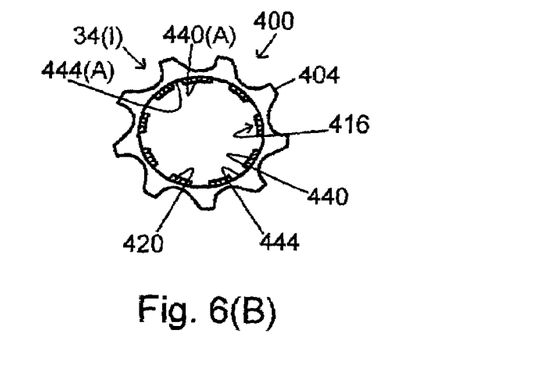

As shown in FIGS. 3, 6(A) and 6(B), in this embodiment sprocket 34(I) comprises a sprocket portion 400 having a plurality of (e.g., 9) radially extending teeth 404 and a tubular coupling portion 408 extending from a first side wall 412 of sprocket portion 400. Coupling portion 408 has a coupling structure 416 disposed on an inner peripheral surface 420 thereof. Sprocket portion 400 and coupling portion 408 are one piece. Coupling portion 408 includes a plurality of splines comprising a plurality of spline projections 440 interleaved with a plurality of spline grooves 444. A spline projection 440(A) and a spline groove 444(A) have a different shape than the other spline projections 440 and spline grooves 444 for engaging the corresponding spline groove 254(A) and spline projection 250(A) on second coupling portion 224 of sprocket 34(G) to set sprocket 34(I) at a predetermined rotational position relative to sprocket 34(G). A lock nut 460 having a threaded inner peripheral surface 464 screws onto a threaded outer peripheral surface 468 disposed at the second end portion 158 of second tubular member 150 for retaining sprockets 34(G)–34(I) on second tubular member 150.

Figure 7:
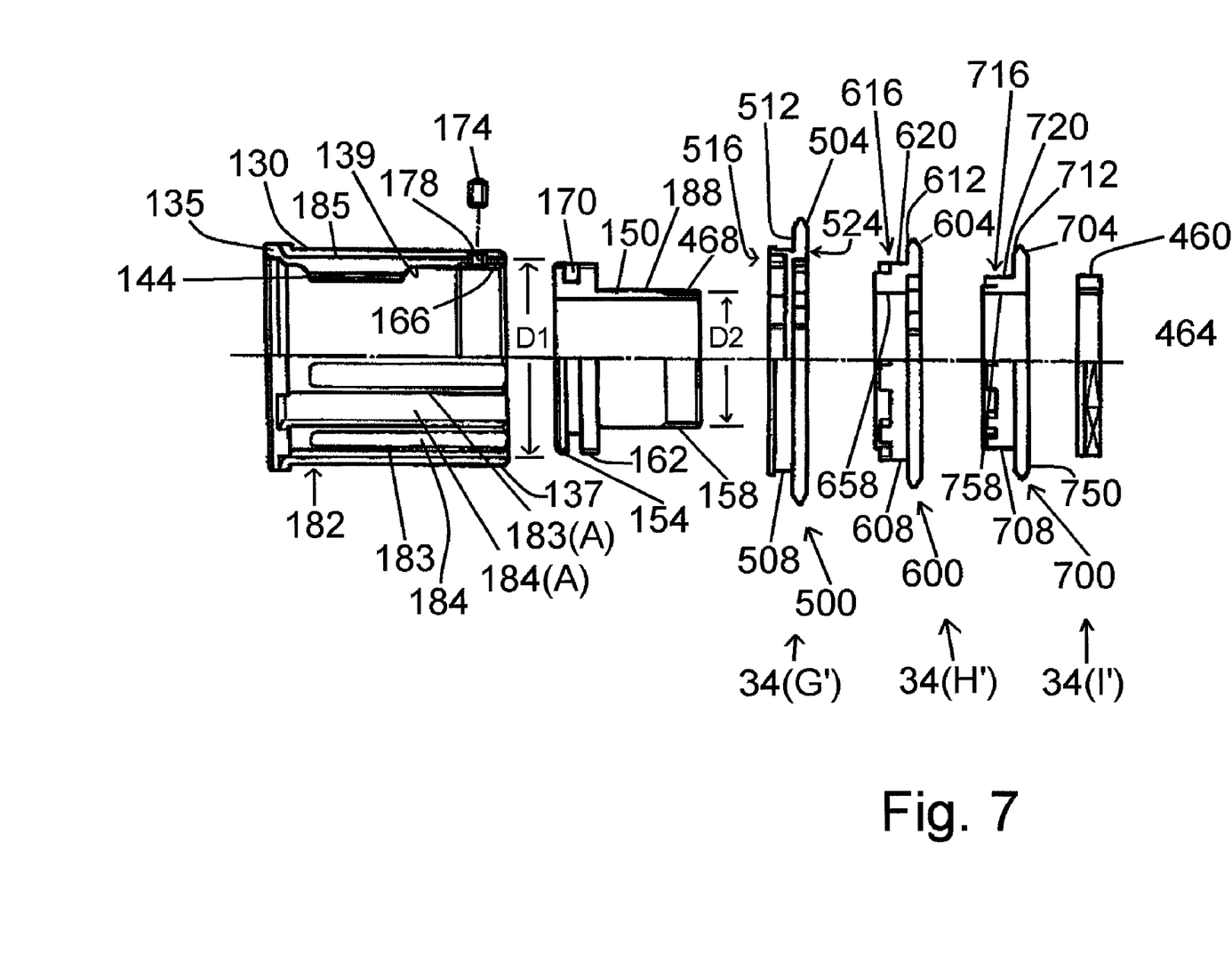
FIG. 7 is an exploded view of some of the components of an alternative embodiment of a sprocket assembly according to the present invention.

FIG. 7 is an exploded view of some of the components of an alternative embodiment of a sprocket assembly according to the present invention. In this embodiment, first tubular member 130, second tubular member 150 and lock nut 460 have the same structure, so a detailed description of these components will be omitted. This embodiment differs from the first embodiment in the structure of sprockets 34(G')–34(I').

Figure 8A:
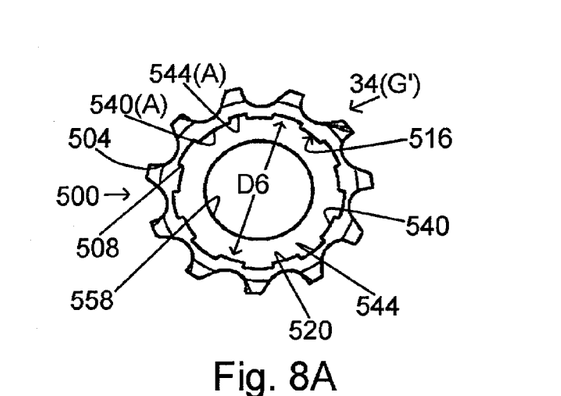
FIGS. 8(A)–8(B) are rear and front views of an 11-tooth transition sprocket used in the sprocket assembly shown in FIG. 7.
Figure 8B:
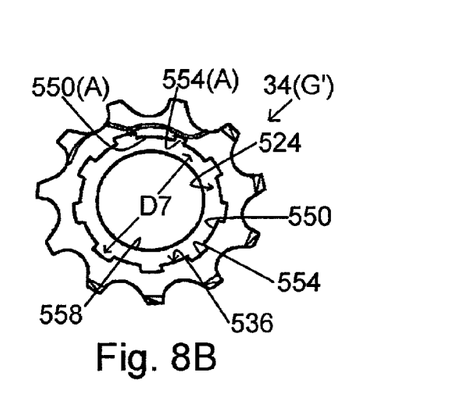

In this embodiment, sprockets 34(G')–34(I') are supported directly on second tubular member 150. As shown in FIGS. 7, 8(A) and 8(B), in this embodiment sprocket 34(G') comprises a sprocket portion 500 having a plurality of (e.g., 11) radially extending teeth 504, a tubular coupling portion 508 extending from a first side wall 512 of sprocket portion 500 and having a first coupling structure 516 disposed on an inner peripheral surface 520 thereof, and a second coupling structure 524 disposed on an inner peripheral surface 536 of sprocket portion 500. Sprocket portion 500 and first coupling portion 508 are one piece.

First coupling portion 508 nonrotatably couples sprocket 34(G') to first tubular member 130, and it includes a plurality of first splines comprising a plurality of first spline projections 540 interleaved with a plurality of first spline grooves 544. A spline projection 540(A) and a spline groove 544(A) have a different shape than the other first spline projections 540 and first spline grooves 544 for engaging the corresponding spline groove 184(A) and spline projection 183(A) on first tubular member 130 to set sprocket 34(G') at a predetermined rotational position on first tubular member 130. Second coupling structure 524 includes a plurality of second splines comprising a plurality of second spline projections 550 interleaved with a plurality of second spline grooves 554, wherein a second spline projection 550(A) and a second spline groove 554(A) have a different shape than the other second spline projections 550 or second spline grooves 554 for reasons discussed below. Sprocket portion 500 has an unsplined inner peripheral surface 558 that fits around the unsplined outer peripheral surface 188 of second tubular member 150. A diameter D6 of inner peripheral surface 520 of first coupling structure 516 is greater than a diameter D7 of inner peripheral surface 536 of second coupling structure 524.

Figure 9A:
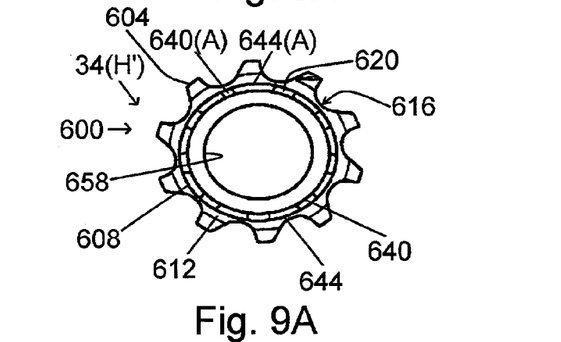
FIGS. 9(A)–9(B) are rear and front views of a 10-tooth sprocket used in the sprocket assembly shown in FIG. 7.
Figure 9B:
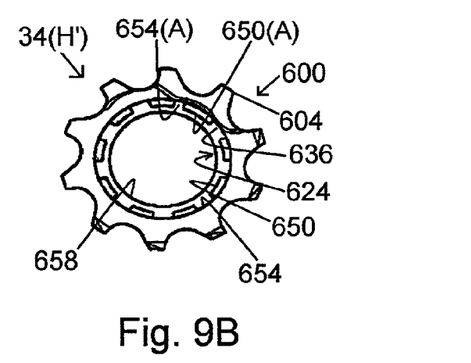

As shown in FIGS. 7, 9(A) and 9(B), in this embodiment sprocket 34(H') comprises a sprocket portion 600 having a plurality of (e.g., 10) radially extending teeth 604, a tubular coupling portion 608 extending from a first side wall 612 of sprocket portion 600 and having a first coupling structure 616 disposed on an outer peripheral surface 620 thereof, and a second coupling structure 624 disposed on an inner peripheral surface 636 of sprocket portion 600. Sprocket portion 600 and first coupling portion 608 are one piece.

First coupling portion 608 nonrotatably couples sprocket 34(H') to sprocket 34(G'), and it includes a plurality of first splines comprising a plurality of first spline projections 640 interleaved with a plurality of first spline grooves 644. A spline projection 640(A) and a spline groove 644(A) have a different shape than the other first spline projections 640 and first spline grooves 644 for engaging the corresponding spline groove 554(A) and spline projection 550(A) on second coupling structure 524 of sprocket 34(G') to set sprocket 34(H') at a predetermined rotational position relative to sprocket 34(G'). Second coupling structure 624 includes a plurality of second splines comprising a plurality of second spline projections 650 interleaved with a plurality of second spline grooves 654, wherein a second spline projection 650(A) and a second spline groove 654(A) have a different shape than the other second spline projections 650 and second spline grooves 654 for reasons discussed below. Coupling portion 608 has an unsplined inner peripheral surface 658 that fits around the unsplined outer peripheral surface 188 of second tubular member 150.

Figure 10A:
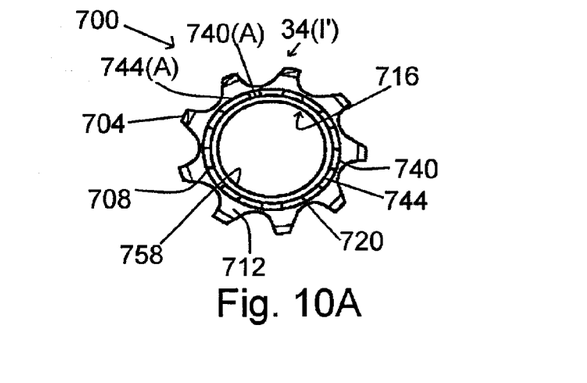
FIGS. 10(A)–10(B) are rear and front views of a 9-tooth sprocket used in the sprocket assembly shown in FIG. 7.
Figure 10B:
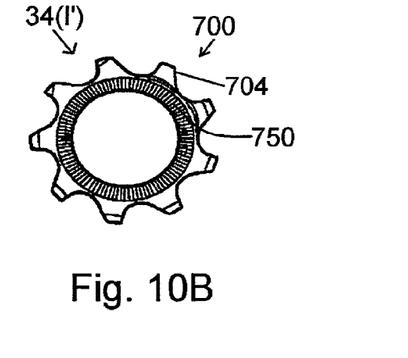

As shown in FIGS. 7, 10(A) and 10(B), in this embodiment sprocket 34(I') comprises a sprocket portion 700 having a plurality of (e.g., 9) radially extending teeth 704 and a tubular coupling portion 708 extending from a first side wall 712 of sprocket portion 700. Coupling portion 708 has a coupling structure 716 disposed on an outer peripheral surface 720 thereof and an unsplined inner peripheral surface 758 that fits around the unsplined outer peripheral surface 188 of second tubular member 150. Sprocket portion 700 and coupling portion 708 are one piece.

Coupling portion 708 nonrotatably couples sprocket 34(I') to sprocket 34(H'), and it includes a plurality of splines comprising a plurality of spline projections 740 interleaved with a plurality of spline grooves 744. A spline projection 740(A) and a spline groove 744(A) have a different shape than the other spline projections 740 and spline grooves 744 for engaging the corresponding second spline groove 654(A) and second spline projection 650(A) on second coupling structure 624 of sprocket 34(H') to set sprocket 34(I') at a predetermined rotational position relative to sprocket 34(H'). Sprocket portion 700 has a knurled side surface 750 to frictionally engage lock nut 460.

Figure 11:
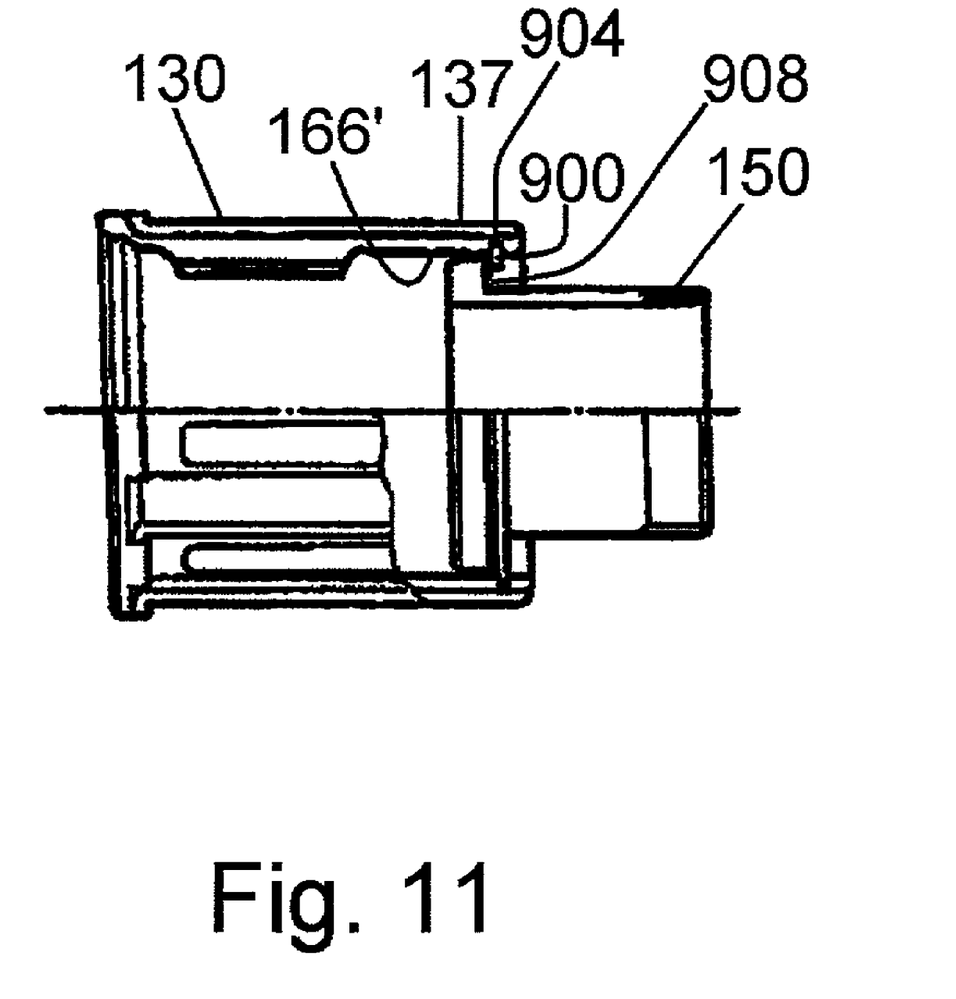
FIG. 11 illustrates an alternative method of coupling the first tubular member and the second tubular member together.

While the above is a description of various embodiments of the present invention, further modifications may be employed without departing from the spirit and scope of the present invention. For example, fastener 174 could be omitted, especially if the materials forming first tubular member 130 and second tubular member 150 are such that threaded surface 166 of first tubular member 130 and threaded surface 162 of second tubular member 150 can support a tightening torque approximately ten times the tightening torque of lock nut 460. Alternatively, as shown in FIG. 11, fastener 174 could be replaced by a snap ring 900 that fits within a groove 904 formed in an inner peripheral surface 166' of first tubular member 130, wherein a side surface 908 of second tubular member 150 abuts against snap ring 900. The size, shape, location or orientation of the various components may be changed as desired. Components that are shown directly connected or contacting each other may have intermediate structures disposed between them. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A stand-alone transition sprocket structured to have further sprockets attached on opposite sides to form a bicycle sprocket cluster that is mounted to an outer tubular member that rotates relative to an inner tubular member through a bearing assembly disposed between the outer tubular member and the inner tubular member, wherein the outer tubular member has a coupling structure formed on an outer peripheral surface thereof for nonrotatably engaging the inner peripheral surfaces of a plurality of sprockets, wherein the outer tubular member does not form a part of the further sprockets attached on the opposite sides of the transition sprocket, wherein the transition sprocket comprises:

a sprocket portion having a plurality of radially extending sprocket teeth dimensioned and circumferentially spaced to engage a bicycle drive chain;

a first coupling portion extending from a first side of the sprocket portion and having a first coupling structure disposed on an inner peripheral surface thereof and dimensioned to freely but nonrotatably couple to and uncouple from the coupling structure formed on the outer peripheral surface of the outer tubular member during normal assembly of the sprocket cluster; and a second coupling portion extending from an opposite second side of the sprocket portion and having a second coupling structure disposed on an outer peripheral surface thereof to freely but nonrotatably couple to and uncouple from a coupling structure formed on an inner peripheral surface of a second sprocket so that the second sprocket is detachably coupled to the outer tubular member through the transition sprocket during normal assembly of the sprocket cluster;

wherein the sprocket portion, the plurality of radially extending teeth, the first coupling portion and the second coupling portion form a continuous one-piece structure.

2. The sprocket according to claim 1 wherein the first coupling structure comprises a plurality of splines.

3. The sprocket according to claim 2 wherein the plurality of splines comprise a plurality of spline projections interleaved with a plurality of spline grooves, and wherein at least one of the plurality of spline projections or spline grooves has a different shape than other ones of the corresponding plurality of spline projections or spline grooves.

4. The sprocket according to claim 1 wherein the second coupling structure comprises a plurality of splines.

5. The sprocket according to claim 4 wherein the plurality of splines comprise a plurality of spline projections interleaved with a plurality of spline grooves, and wherein at least one of the plurality of spline projections or spline grooves has a different shape than other ones of the corresponding plurality of spline projections or spline grooves.

6. The sprocket according to claim 1 wherein the first coupling structure comprises a plurality of first splines, and wherein the second coupling structure comprises a plurality of second splines.

7. The sprocket according to claim 6 wherein the plurality of first splines comprise a plurality of first spline projections interleaved with a plurality of first spline grooves, wherein at least one, of the plurality of first spline projections or first spline grooves has a different shape than other ones of the corresponding plurality of first spline projections or first spline grooves, wherein the plurality of second splines comprise a plurality of second spline projections interleaved with a plurality of second spline grooves, wherein at least one of the plurality of second spline projections or second spline grooves has a different shape than other ones of the corresponding plurality of second spline projections or second spline grooves.

8. The sprocket according to claim 1 wherein the first coupling portion has a tubular shape, and wherein the second coupling portion has a tubular shape.

9. The sprocket according to claim 8 wherein a diameter of the inner peripheral surface of the first coupling portion is greater than a diameter of the inner peripheral surface of the second coupling portion.

10. The sprocket according to claim 1 wherein the transition sprocket has at least one inner peripheral surface dimensioned to be incapable of fitting around an outer peripheral surface of a laterally outermost free end of the outer tubular member.

11. A stand-alone transition sprocket structured to have further sprockets attached on opposite sides to form a bicycle sprocket cluster that is mounted to an outer tubular member that rotates relative to an inner tubular member through a bearing assembly disposed between the outer tubular member and the inner tubular member, wherein the outer tubular member has a coupling structure formed on an outer peripheral surface thereof for engaging the inner peripheral surfaces of a plurality of sprockets, wherein the transition sprocket comprises:

a sprocket portion having a plurality of radially extending sprocket teeth dimensioned and circumferentially spaced to engage a bicycle drive chain;

a first coupling portion having a tubular shape and extending from a first side of the sprocket portion and having a first coupling structure disposed on an inner peripheral surface thereof and dimensioned to freely couple to and uncouple from the coupling structure formed on the outer peripheral surface of the outer tubular member during normal assembly of the sprocket cluster; and a second coupling portion having a tubular shape and extending from an opposite second side of the sprocket portion and having a second coupling structure disposed on an outer peripheral surface thereof to freely couple to and uncouple from a coupling structure formed on an inner peripheral surface of a second sprocket so that the second sprocket is detachably coupled to the outer tubular member through the transition sprocket during normal assembly of the sprocket cluster;

wherein the sprocket portion, the plurality of radially extending teeth, the first coupling portion and the second coupling portion form a continuous one-piece structure;

wherein a diameter of the inner peripheral surface of the first coupling portion is greater than a diameter of an outer peripheral surface of the second coupling portion.

12. The sprocket according to claim 11 wherein the diameter of the outer peripheral surface of the second coupling portion is measured at a junction of the second coupling portion and a side wall of the sprocket portion.

13. The sprocket according to claim 11 wherein the first coupling structure comprises a plurality of first splines, and wherein the second coupling structure comprises a plurality of second splines.

14. The sprocket according to claim 13 wherein the second coupling portion has an unsplined inner peripheral surface.

15. The sprocket according to claim 13 wherein the plurality of first splines comprise a plurality of first spline projections interleaved with a plurality of first spline grooves, and wherein at least one of the plurality of first spline projections or first spline grooves has a different shape than other ones of the corresponding plurality of first spline projections or first spline grooves.

16. The sprocket according to claim 13 wherein the plurality of second splines comprise a plurality of second spline projections interleaved with a plurality of second spline grooves, and wherein at least one of the plurality of second spline projections or second spline grooves has a different shape than other ones of the corresponding plurality of second spline projections or second spline grooves.

17. The sprocket according to claim 13 wherein the plurality of first splines comprise a plurality of first spline projections interleaved with a plurality of first spline grooves, wherein at least one of the plurality of first spline projections or first spline grooves has a different shape than other ones of the corresponding plurality of first spline projections or first spline grooves, wherein the plurality of second splines comprise a plurality of second spline projections interleaved with a plurality of second spline grooves, wherein at least one of the plurality of second spline projections or second spline grooves has a different shape than other ones of the corresponding plurality of second spline projections or second spline grooves.

18. The sprocket according to claim 17 wherein the second coupling portion has an unsplined inner peripheral surface.

19. A stand-alone transition sprocket structured to have further sprockets attached on opposite sides to form a bicycle sprocket cluster that is mounted to an outer tubular member that rotates relative to an inner tubular member through a bearing assembly disposed between the outer tubular member and the inner tubular member, wherein the transition sprocket comprises:

a sprocket portion having a plurality of radially extending sprocket teeth dimensioned and circumferentially spaced to engage a bicycle drive chain; and a coupling portion extending from a side of the sprocket portion and having a coupling structure disposed on an outer peripheral surface thereof to freely but nonrotatably couple to and uncouple from a coupling structure formed on an inner peripheral surface of a second sprocket so that the second sprocket is detachably coupled to the outer tubular member through the transition sprocket during normal assembly of the sprocket cluster;

wherein the coupling structure on the outer peripheral surface of the transition sprocket and the coupling structure on the inner peripheral surface of the second sprocket are the sole coupling mechanism between the transition sprocket and the second sprocket;

wherein the sprocket portion, the plurality of radially extending teeth and the coupling portion form a continuous one-piece structure.

20. The sprocket according to claim 19 wherein the coupling portion has a tubular shape.

21. The sprocket according to claim 20 wherein the coupling portion has an unsplined inner peripheral surface to engage an outer peripheral surface of the outer tubular member so that the transition sprocket is sandwiched between the outer tubular member and the second sprocket.

22. The sprocket according to claim 19 wherein the coupling structure comprises a plurality of splines.

23. The sprocket according to claim 22 wherein the plurality of splines comprise a plurality of spline projections interleaved with a plurality of spline grooves, and wherein at least one of the plurality of spline projections or spline grooves has a different shape than other ones of the corresponding plurality of spline projections or spline grooves.

24. The sprocket according to claim 23 wherein the coupling portion has an unsplined inner peripheral surface to engage an outer peripheral surface of the outer tubular member so that the transition sprocket is sandwiched between the outer tubular member and the second sprocket.

25. The sprocket according to claim 19 wherein the transition sprocket has at least one inner peripheral surface dimensioned to be incapable of fitting around an outer peripheral surface of a laterally outermost free end of the outer tubular member.

26. A stand-alone transition sprocket structured to have further sprockets attached on opposite sides to form a bicycle sprocket cluster that is mounted to an outer tubular member that rotates relative to an inner tubular member through a bearing assembly disposed between the outer tubular member and the inner tubular member, wherein the outer tubular member has a coupling structure formed on an outer peripheral surface thereof for nonrotatably engaging the inner peripheral surfaces of a plurality of sprockets, wherein the outer tubular member does not form a part of the further sprockets attached on the opposite sides of the transition sprocket, wherein the transition sprocket comprises:

a sprocket portion having a plurality of radially extending sprocket teeth dimensioned and circumferentially spaced to engage a bicycle drive chain;

a first coupling portion extending from a first side of the sprocket portion and having a first coupling structure disposed on an inner peripheral surface thereof and dimensioned to freely but nonrotatably couple to and uncouple from the coupling structure formed on the outer peripheral surface of the outer tubular member; and a second coupling structure disposed on an inner peripheral surface of the sprocket to freely but nonrotatably couple to and uncouple from a coupling structure formed on an outer peripheral surface of a second sprocket so that the second sprocket is detachably sandwiched between the outer tubular member and the transition sprocket during normal assembly of the sprocket cluster;

wherein the sprocket portion, the plurality of radially extending teeth, the first coupling portion and the second coupling structure form a continuous one-piece structure.

27. The sprocket according to claim 26 wherein the second coupling structure is disposed on an inner peripheral surface of the sprocket portion.

28. The sprocket according to claim 26 wherein the first coupling structure comprises a plurality of splines.

29. The sprocket according to claim 28 wherein the plurality of splines comprise a plurality of spline projections interleaved with a plurality of spline grooves, and wherein at least one of the plurality of spline projections or spline grooves has a different shape than other ones of the corresponding plurality of spline projections or spline grooves.

30. The sprocket according to claim 26 wherein the second coupling structure comprises a plurality of splines.

31. The sprocket according to claim 30 wherein the plurality of splines comprise a plurality of spline projections interleaved with a plurality of spline grooves, and wherein at least one of the plurality of spline projections or spline grooves has a different shape than other ones of the corresponding plurality of spline projections or spline grooves.

32. The sprocket according to claim 26 wherein the first coupling structure comprises a plurality of first splines, and wherein the second coupling structure comprises a plurality of second splines.

33. The sprocket according to claim 32 wherein the plurality of first splines comprise a plurality of first spline projections interleaved with a plurality of first spline grooves, wherein at least one of the plurality of first spline projections or first spline grooves has a different shape than other ones of the corresponding plurality of first spline projections or first spline grooves, wherein the plurality of second splines comprise a plurality of second spline projections interleaved with a plurality of second spline grooves, wherein at least one of the plurality of second spline projections or second spline grooves has a different shape than other ones of the corresponding plurality of second spline projections or second spline grooves.

34. The sprocket according to claim 26 wherein the first coupling portion has a tubular shape.

35. The sprocket according to claim 34 wherein a diameter of the inner peripheral surface of the first coupling portion is greater than a diameter of the inner peripheral surface having the second coupling portion.

36. The sprocket according to claim 35 wherein the second coupling structure is disposed on an inner peripheral surface of the sprocket portion.

37. The sprocket according to claim 36 wherein the first coupling structure comprises a plurality of first splines, and wherein the second coupling structure comprises a plurality of second splines.

38. The sprocket according to claim 37 wherein the plurality of first splines comprise a plurality of first spline projections interleaved with a plurality of first spline grooves, wherein at least one of the plurality of first spline projections or first spline grooves has a different shape than other ones of the corresponding plurality of first spline projections or first spline grooves, wherein the plurality of second splines comprise a plurality of second spline projections interleaved with a plurality of second spline grooves, wherein at least one of the plurality of second spline projections or second spline grooves has a different shape than other ones of the corresponding plurality of second spline projections or second spline grooves.

39. The sprocket according to claim 26 wherein the transition sprocket has at least one inner peripheral surface dimensioned to be incapable of fitting around an outer peripheral surface of a laterally outermost free end of the outer tubular member.

40. An apparatus for supporting a plurality of sprockets comprising:
   a first tubular member having a first end portion and a second end portion, wherein the first tubular member has a first outer peripheral surface for supporting a first plurality of sprockets radially outwardly thereupon, and wherein the first tubular member rotates relative to an inner tubular member through a bearing assembly disposed between the first tubular member and the inner tubular member;
   a separate second tubular member having a first end portion and a second end portion, wherein the second tubular member has a second outer peripheral surface for supporting a second plurality of sprockets radially outwardly thereupon so that the second plurality of sprockets are located axially outwardly from an axially outermost terminating end of the second end portion of the first tubular member;
   wherein the first end portion of the second tubular member is coupled to the second end portion of the first tubular member so that the first tubular member and the second tubular member can be freely attached to and detached from each other.

41. The apparatus according to claim 40 wherein a diameter of the first outer peripheral surface is different from a diameter of the second outer peripheral surface.

42. The apparatus according to claim 40 further comprising a first bearing race disposed on an inner peripheral surface of the first tubular member.

43. The apparatus according to claim 42 wherein the first bearing race is disposed at the first end portion of the first tubular member.

44. The apparatus according to claim 42 further comprising a second bearing race disposed on the inner peripheral surface of the first tubular member.

45. The apparatus according to claim 44 wherein the first bearing race is disposed at the first end portion of the first tubular member.

46. The apparatus according to claim 40 wherein an outer peripheral surface of the first end portion of the second tubular member is coupled to an inner peripheral surface of the second end portion of the first tubular member.

47. The apparatus according to claim 40 further comprising a fastener coupling the first end portion of the second tubular member to the second end portion of the first tubular member.

48. The apparatus according to claim 40 wherein the first end portion of the second tubular member has a threaded peripheral surface that meshes with a threaded peripheral surface of the second end portion of the first tubular member.

49. The apparatus according to claim 48 wherein an outer peripheral surface of the first end portion of the second tubular member has a threaded portion that screws into a threaded portion of an inner peripheral surface of the second end portion of the first tubular member.

50. The apparatus according to claim 49 further comprising a fastener coupling the first end portion of the second tubular member to the second end portion of the first tubular member.

51. The apparatus according to claim 40 further comprising a plurality of first tubular member splines circumferentially disposed around the first outer peripheral surface of the first tubular member for nonrotatably supporting at least one of the first plurality of sprockets.

52. The apparatus according to claim 51 wherein the second outer peripheral surface of the second tubular member that supports at least one of the second plurality of sprockets is unsplined.

53. The apparatus according to claim 52 wherein the plurality of first tubular member splines are adapted to nonrotatably support all of the first plurality of sprockets, and wherein the unsplined outer peripheral surface of the second tubular member is adapted to support all of the second plurality of sprockets.

54. The apparatus according to claim 53 wherein a diameter of the outer peripheral surface of the first tubular member that supports at least one of the first plurality of sprockets is greater than a diameter of the outer peripheral surface of the second tubular member that supports at least one of the second plurality of sprocket.

55. The sprocket according to claim 54 wherein the plurality of first tubular member splines comprise a plurality of first tubular member spline projections interleaved with a plurality of first tubular member spline grooves, and wherein at least one of the plurality of first tubular member spline projections or first tubular member spline grooves has a different shape than other ones of the corresponding plurality of first tubular member spline projections or first tubular member spline grooves.

56. The apparatus according to claim 55 wherein the first end portion of the second tubular member has a threaded peripheral surface that meshes with a threaded peripheral surface of the second end portion of the first tubular member.

57. The apparatus according to claim 56 further comprising a fastener coupling the first end portion of the second tubular member to the second end portion of the first tubular member.

58. The apparatus according to claim 51 further comprising a transition sprocket comprising:

a sprocket portion having a plurality of radially extending teeth;

a first coupling portion extending from a first side of the sprocket portion and having a first coupling structure comprising a plurality of sprocket splines engaging the plurality of first tubular member splines; and a second coupling portion extending from an opposite second side of the sprocket portion and having a second coupling structure disposed on an outer peripheral surface thereof to engage a coupling structure formed on an inner peripheral surface of a second sprocket so that the second sprocket is supported to the first tubular member through the transition sprocket.

59. The apparatus according to claim 51 further comprising a transition sprocket comprising:

a sprocket portion having a plurality of radially extending teeth;

a first coupling portion extending from a first side of the sprocket portion and having a first coupling structure comprising a plurality of sprocket splines engaging the plurality of first tubular member splines; and a second coupling structure disposed on an inner peripheral surface of the sprocket to engage a coupling structure formed on an outer peripheral surface of a second sprocket so that the second sprocket is sandwiched between the second tubular member and the transition sprocket.

60. The apparatus according to claim 40 wherein the second end portion of the second tubular member has a threaded outer peripheral surface.

* * * * *